United States Patent
Vos (10) Patent No.: US 11,350,687 B2
(45) Date of Patent: Jun. 7, 2022

(54) HELMET MANUFACTURING METHOD AND STRUCTURE OF HELMET

(71) Applicant: Vog—Image Police Inc., Taichung (TW)

(72) Inventor: Gavin Michael Vos, Taichung (TW)

(73) Assignee: VOG—IMAGE POLICE INC., Taichung (TW)

(*) Notice: Subject to any disclaimer, the term of this patent is extended or adjusted under 35 U.S.C. 154(b) by 288 days.

(21) Appl. No.: 16/232,683

(22) Filed: Dec. 26, 2018

(65) Prior Publication Data

US 2019/0191810 A1     Jun. 27, 2019

Related U.S. Application Data

(63) Continuation of application No. PCT/CN2017/118675, filed on Dec. 26, 2017.

(51) Int. Cl.
| | |
|---|---|
| *B29C 45/14* | (2006.01) |
| *A42C 2/00* | (2006.01) |
| *B29C 69/02* | (2006.01) |
| *B29C 44/12* | (2006.01) |
| *B29K 105/04* | (2006.01) |
| *A42B 3/12* | (2006.01) |

(Continued)

(52) U.S. Cl.
CPC ......... *A42B 3/125* (2013.01); *A42B 3/06* (2013.01); *A42B 3/062* (2013.01); *A42B 3/105* (2013.01); *A42C 2/00* (2013.01); *A42C 2/002* (2013.01); *B29C 44/12* (2013.01); *B29C 45/14* (2013.01); *B29C 45/14467* (2013.01); *B29C 69/02* (2013.01); *B29C 2045/14524* (2013.01); *B29K 2105/04* (2013.01); *B29L 2031/4821* (2013.01); *B29L 2031/768* (2013.01)

(58) Field of Classification Search
CPC ................................................. B29C 45/14467
See application file for complete search history.

(56) References Cited

U.S. PATENT DOCUMENTS

| | | | |
|---|---|---|---|
| 3,820,163 | A | 6/1974 | Rappleyea |
| 5,298,208 | A | 3/1994 | Sibley et al. |

(Continued)

FOREIGN PATENT DOCUMENTS

| | | |
|---|---|---|
| CN | 2315801 Y | 4/1999 |
| CN | 201854732 U | 6/2011 |

(Continued)

*Primary Examiner* — Alison L Hindenlang
*Assistant Examiner* — Virak Nguon
(74) *Attorney, Agent, or Firm* — Muncy, Geissler, Olds & Lowe, P.C.

(57) ABSTRACT

A helmet manufacturing method involves: producing a shell and a protector, the shell having two opposing cheek-protecting portions, the protector having a jaw-protecting portion and a neck-protecting portion connected to the jaw-protecting portion; putting the shell and the protector in a die such that bottom edges of the cheek-protecting portions of the shell connect to a top edge of the neck-protecting portion of the protector; introducing a foam material into the die, apply heat and pressure to the foam material such that the foam material expands and binds to an inner side of the shell and an inner side of the protector; and taking a helmet finished product out of the die. Therefore, both the jaw-protecting portion of the integrally-formed protector and the helmet finished product are reinforced.

9 Claims, 10 Drawing Sheets

(51) Int. Cl.
  *A42B 3/10*   (2006.01)
  *A42B 3/06*   (2006.01)
  *B29L 31/48*  (2006.01)
  *B29L 31/00*  (2006.01)

(56) References Cited

U.S. PATENT DOCUMENTS

| | | |
|---|---|---|
| 7,243,378 B2 | 7/2007 | Desarmaux et al. |
| 2005/0120467 A1 | 6/2005 | Desarmaux et al. |
| 2010/0281603 A1 | 11/2010 | Ho |
| 2017/0318893 A1* | 11/2017 | Durham ................ A42B 3/062 |

FOREIGN PATENT DOCUMENTS

| | | | |
|---|---|---|---|
| CN | 104337099 A | 2/2015 | |
| CN | 104413991 A | 3/2015 | |
| CN | 205923070 U | 2/2017 | |
| CN | 104413991 B * | 9/2017 | |
| EP | 1627575 A1 * | 2/2006 | ............... A42B 3/08 |
| JP | 2003-183924 A | 7/2003 | |
| TW | 305265 U | 5/1997 | |
| TW | 566096 U | 12/2003 | |
| TW | M500472 U | 5/2015 | |
| WO | 2015/134995 A1 | 9/2015 | |

\* cited by examiner

HELMET MANUFACTURING METHOD AND STRUCTURE OF HELMET

CROSS REFERENCE TO RELATED APPLICATIONS

This application is a Continuation of co-pending Application No. PCT/CN2017/118675, filed on Dec. 26, 2017, for which priority is claimed under 35 U.S.C. § 120.

BACKGROUND OF THE INVENTION

1. Technical Field

The present disclosure relates to helmets and, more particularly, to a helmet manufacturing method and structure of helmet.

A conventional helmet manufacturing method involves forming an outer shell and an inner liner and then coupling the shell and the liner together by glue or any other means. For instance, U.S. Pat. No. 7,243,378 discloses producing a shell and a jaw-protecting component separately, wherein the shell is produced by in-mold technology, and the jaw-protecting component is produced by injection molding. Upon completion of their separate production processes, the shell and the jaw-protecting component are coupled together by glue or any other fastening-unfastening means (such as Velcro). The liner is mounted on the inner wall of the shell by direct fixation or any other fastening-unfastening means (such as Velcro). Taiwan patent TW566096 discloses producing a shell and a liner separately and then mounting the liner on the inner wall of the shell by direct fixation or any other fastening-unfastening means (such as Velcro), wherein the shell is formed by injection molding. The liner is formed by winding a cord. Furthermore, U.S. Pat. No. 5,298,208 discloses producing a shell and a liner separately and then coupling them together, wherein the shell is made of high-density plastic, whereas the resilient liner is formed by injection molding.

However, the shape of the helmet is usually complicated. To enable the shell and the liner to fit each other seamlessly, the manufacturing process must use a large amount of glue to the detriment of cost efficiency and weight control of the helmet finished product. For the sake of cost control, the shell and the liner are usually adhered together partially; as a result, gaps therebetween are found wherever not adhered. The gaps affect the structural strength of the helmet, thereby reducing the protection which the helmet provides to users.

BRIEF SUMMARY OF THE INVENTION

It is an objective of the present disclosure to provide a helmet manufacturing method conducive to enhancement of the structural strength of the helmet finished product.

In order to achieve the above and other objectives, the manufacturing method of the present disclosure comprises the steps of: producing a shell and a protector, the shell having a head-protecting portion and two opposing cheek-protecting portions, the two cheek-protecting portions extending downward, integrally from left and right ends of the head-protecting portion, respectively, the protector having a jaw-protecting portion and a neck-protecting portion, the neck-protecting portion extending backward, integrally from a back end of the jaw-protecting portion; putting the shell and the protector in a die such that bottom edges of the cheek-protecting portions of the shell connect to a top edge of the neck-protecting portion of the protector; introducing a foam material into the die, apply heat and pressure to the foam material such that the foam material expands and binds to an inner side of the shell and an inner side of the protector; and removing, upon completion of a foaming process, the die, so as to obtain a helmet finished product.

Therefore, the manufacturing method of the present disclosure enables the foam material to fit tightly to the inner side of the shell and the inner side of the protector, thereby enhancing the structural strength of the helmet finished product.

Preferably, the shell is integrally formed by vacuum forming. Alternatively, one body and one front frame are formed by vacuum forming, and then the front frame is connected to the front edge of the body. Upon completion of the aforesaid process, the shell thus formed is further processed, so as to reduce the weight of the shell and enhance ventilation thereof.

Preferably, the protector is integrally formed by vacuum forming. Alternatively, two curved bars are formed by vacuum forming, and then the two curved bars are connected. Alternatively, the two curved bars and one terminal cover are formed by vacuum forming, and then the two curved bars are connected to the terminal cover. Upon completion of the aforesaid process, the protector thus formed is further processed, so as to reduce the weight of the protector and enhance ventilation thereof.

Another objective of the present disclosure is to provide a helmet manufactured by the manufacturing method. The helmet is manufactured essentially by coupling together the shell and the protector, using a foam liner formed as a result of expansion of the foam material, so as to eliminate the gaps between the shell and the protector and thus reinforce the helmet thus manufactured.

Fine structures, features, assembly or operation of the helmet of the present disclosure are illustrated by embodiments and described below. However, persons skilled in the art understand that the description below and the specific embodiments are illustrative of the present disclosure rather than restrictive of the claims of the present disclosure.

DETAILED DESCRIPTION OF THE INVENTION

Figure 1:
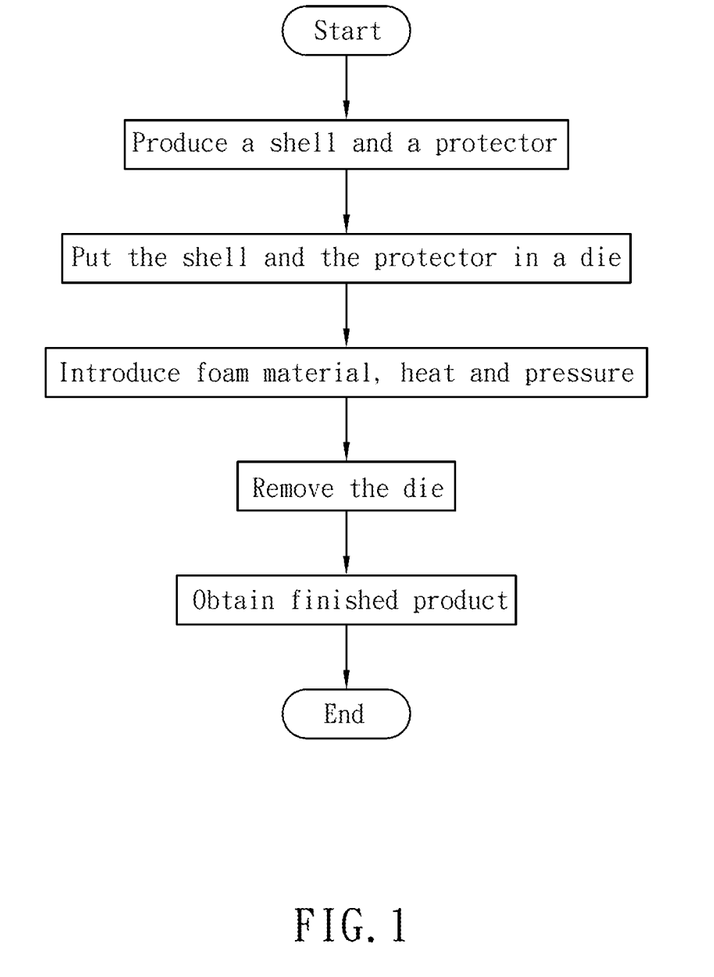
FIG. 1 is a schematic view of the process flow of a manufacturing method according to the first embodiment of the present disclosure.

Referring to FIG. 1, a manufacturing method according to the first embodiment of the present disclosure comprises the steps described below.

Figure 3:
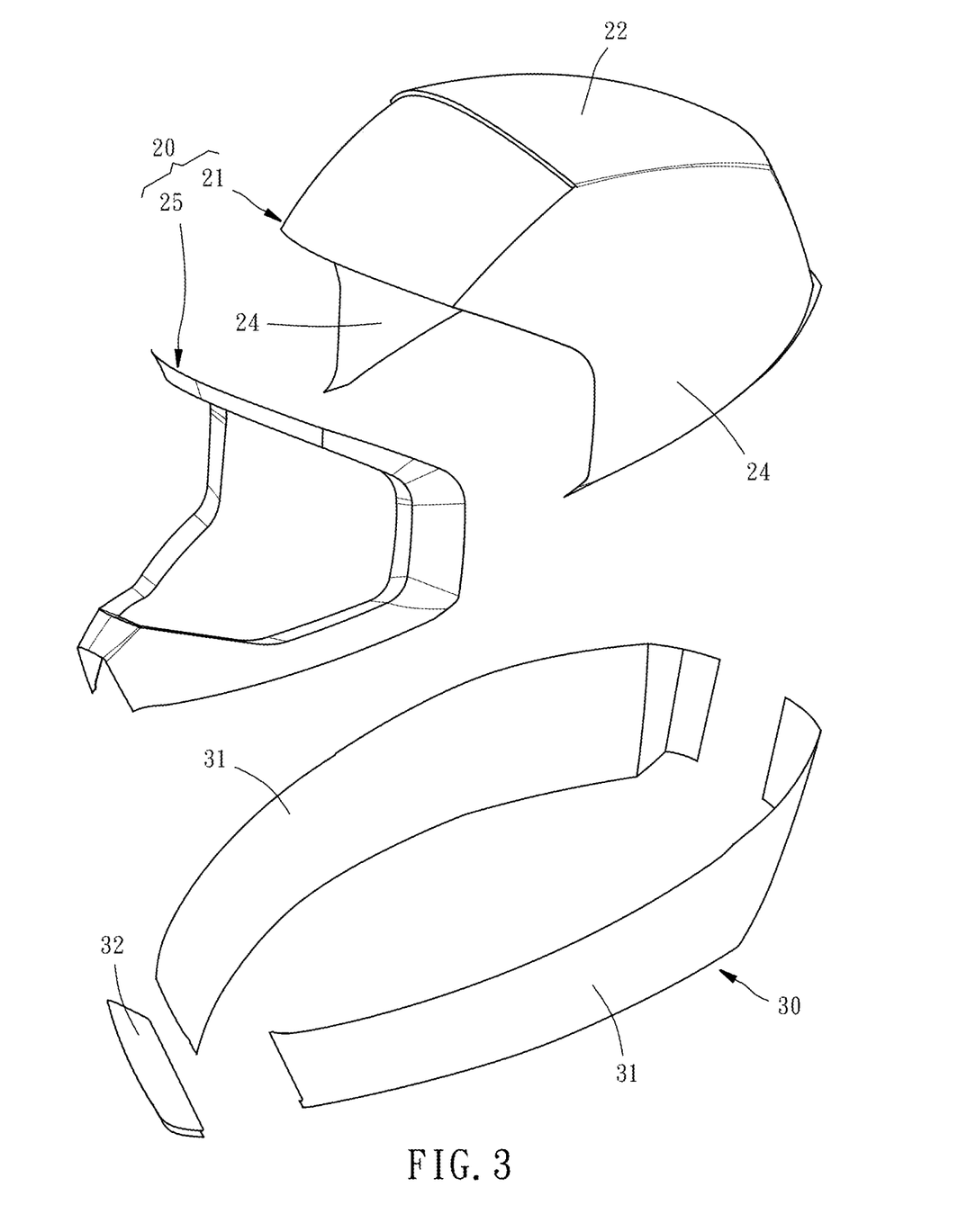
FIG. 3 is an exploded view of the helmet according to the first embodiment of the present disclosure.
Figure 4:
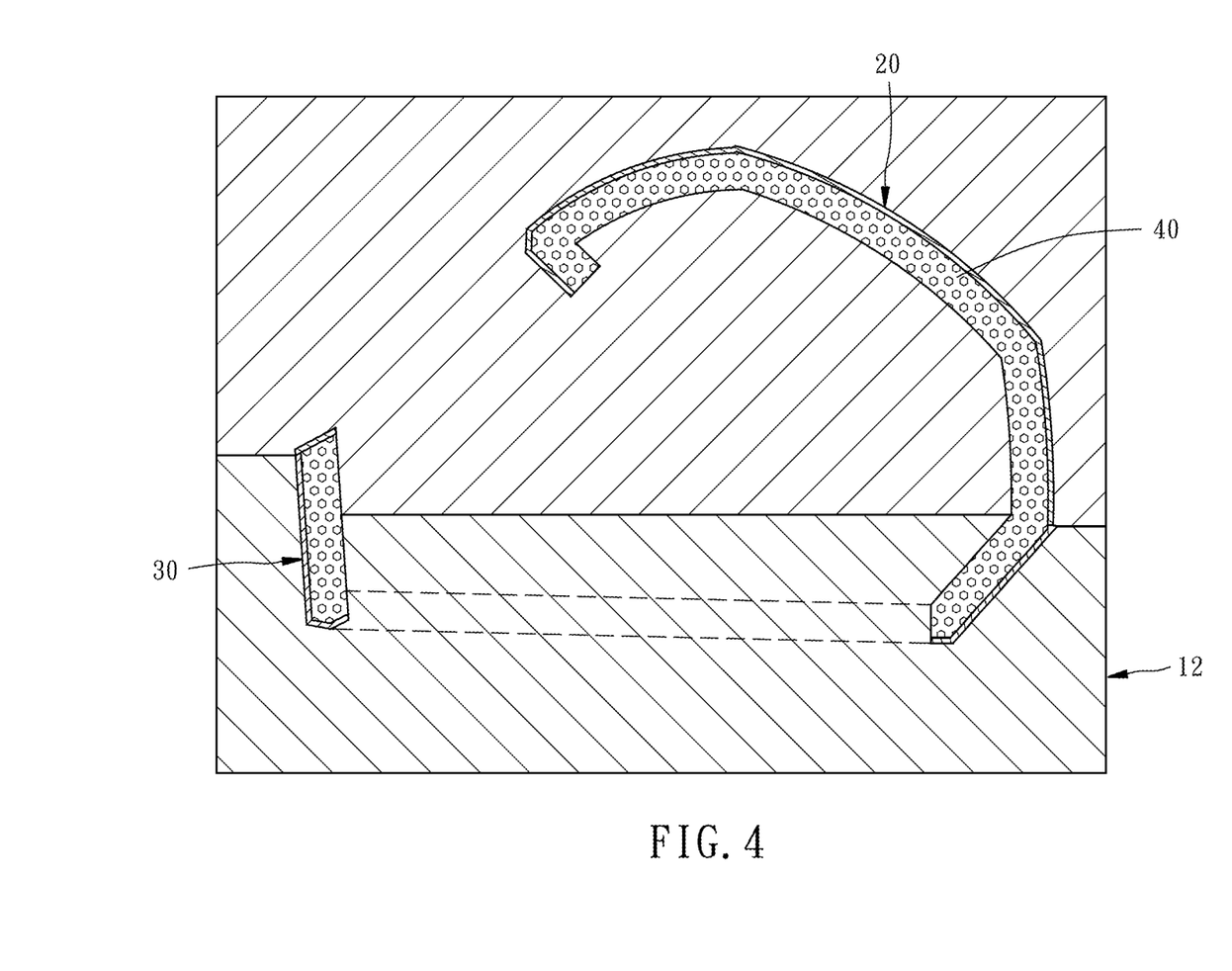
FIG. 4 is a cross-sectional view related to the manufacturing method according to the first embodiment of the present disclosure, showing that a shell and a protector are put in a die.

Step a): produce a shell 20 and a protector 30. In this embodiment, the shell 20 has a body 21 and a front frame 25, as shown in FIG. 3. Both the body 21 and the front frame 25 are integrally produced by vacuum forming. The body 21 has a head-protecting portion 22 and two opposing cheek-protecting portions 24. The two cheek-protecting portions 24 extend downward, integrally from the left and right ends of the head-protecting portion 22, respectively. The front frame 25 is connected to the front edge of the body 21. The protector 30 has two opposing curved bars 31 and a terminal cover 32, as shown in FIG. 3. Both the curved bars 31 and the terminal cover 32 are integrally produced by vacuum forming. The front ends of the two curved bars 31 are connected to the terminal cover 32 such that the front ends of the two curved bars 31 and the terminal cover 32 jointly form a jaw-protecting portion 34. The back ends of the two curved bars 31 are connected to jointly form a neck-protecting portion 36.

Step b): as shown in FIG. 3, put the shell 20 and the protector 30 in a die 12 such that the bottom edges of the cheek-protecting portions 24 of the shell 20 are connected to the top edge of the neck-protecting portion 36 of the protector 30.

Step c): as shown in FIG. 3, introduce a foam material 40 into the die 12 such that the foam material 40 fully covers the entire inner side of the shell 20 and the entire inner side of the protector 30, then apply heat and pressure to the foam material 40. A foam liner 42 formed upon completion of the expansion of the foam material 40 couples the shell 20 and the protector 30 together. In this embodiment, the foam material 40 is EPS, EPP, EPO or EPE, but the present disclosure is not limited thereto.

Figure 2:
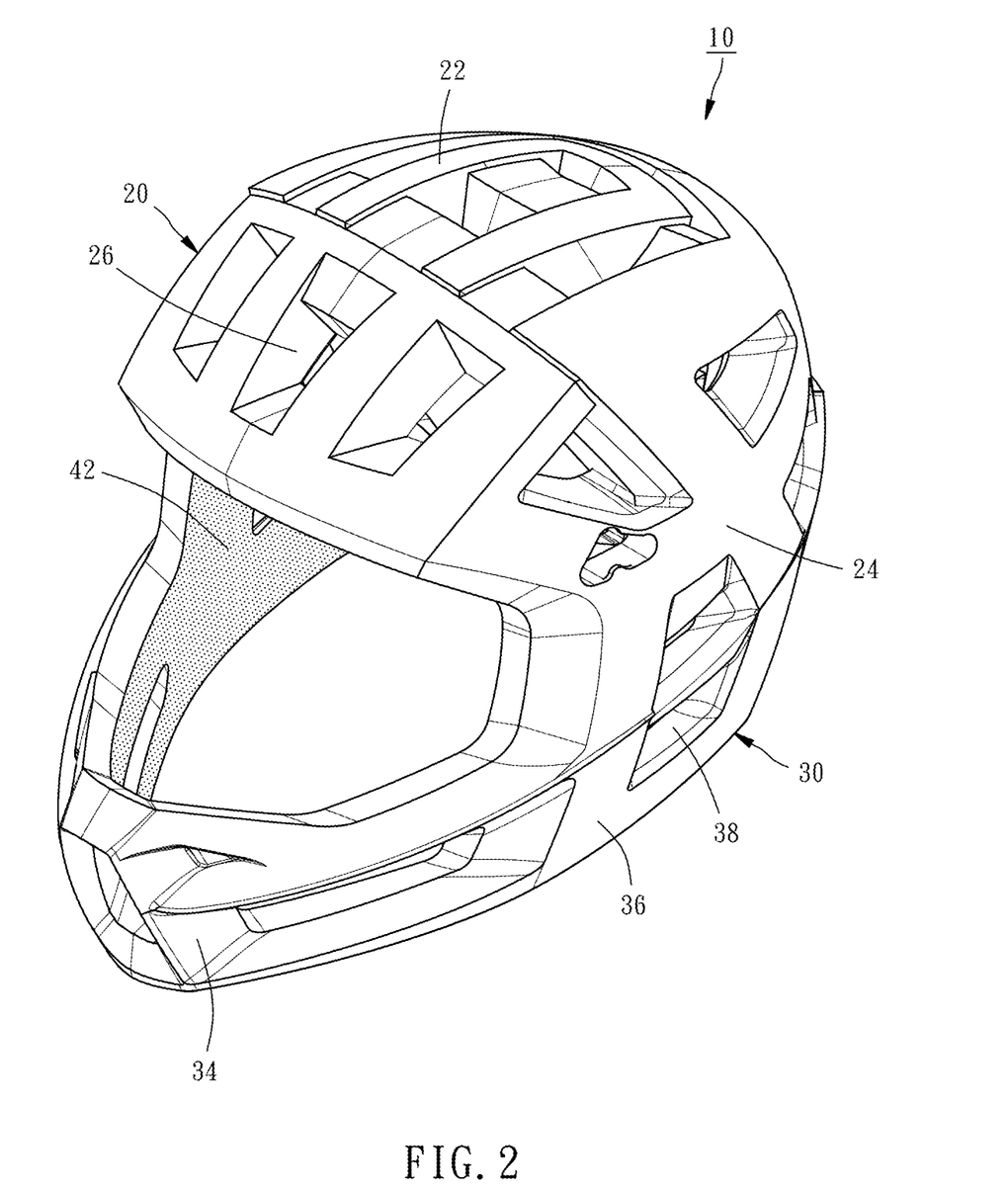
FIG. 2 is a perspective view of a helmet according to the first embodiment of the present disclosure.

Step d): remove, upon completion of a foaming process, the die 12, as shown in FIG. 2, so as to obtain a helmet finished product 10.

In step a), after being produced, the shell 20 and the protector 30 are each processed such that the shell 20 and the protector 30 each have a plurality of hollowed-out recesses 26, 38. The hollowed-out recesses 26, 38 reduce the weight of the helmet 10 and enhance ventilation thereof. The foam material 40 introduced in step c) is disposed on the shell 20 and the protector 30 except for the hollowed-out recesses 26, 38, depending on the structural design of the die 12, and thus does not conceal the hollowed-out recesses 26, 38.

Figure 5:
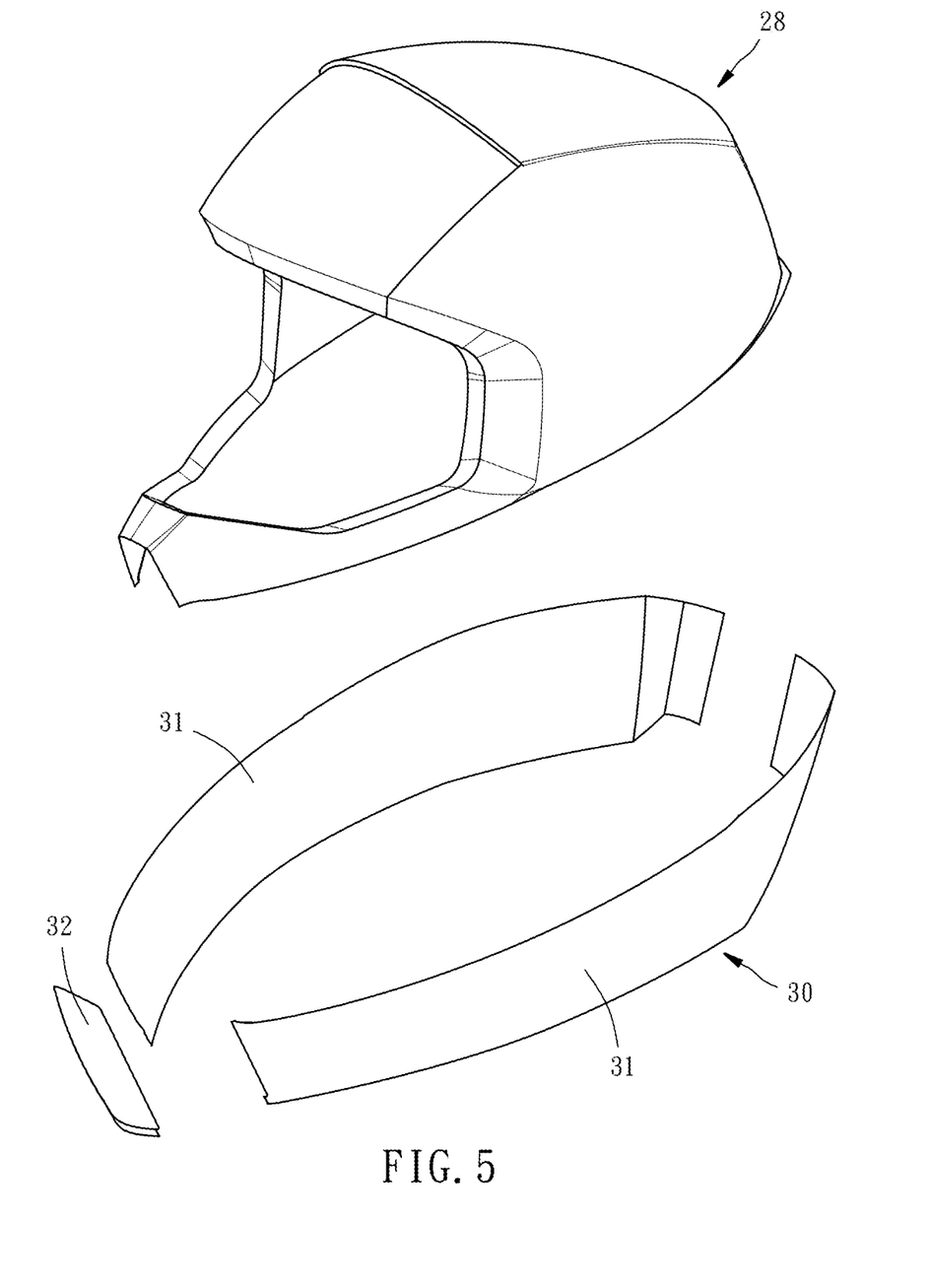
FIG. 5 is an exploded view of the helmet according to the second embodiment of the present disclosure.
Figure 6:
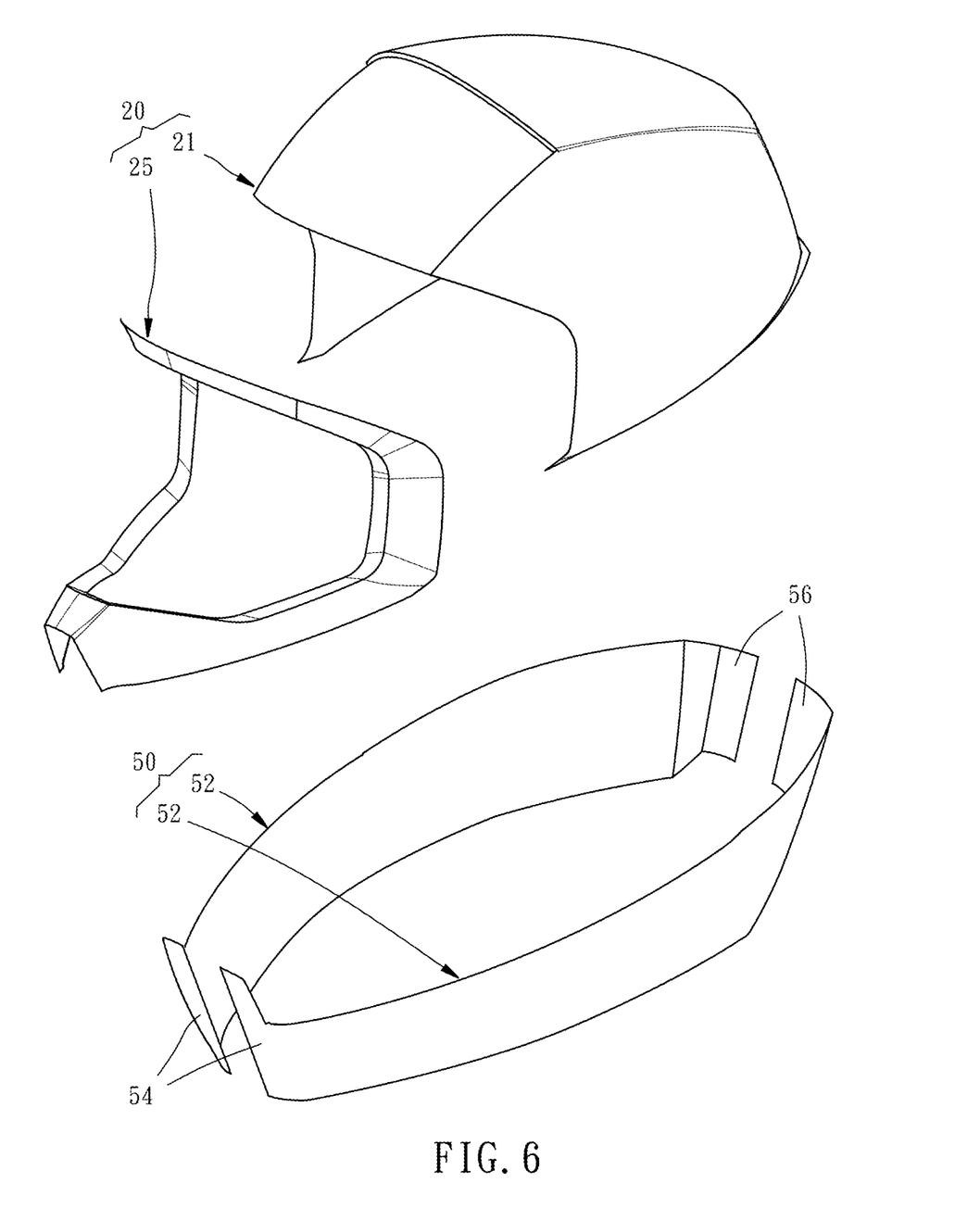
FIG. 6 is an exploded view of the helmet according to the third embodiment of the present disclosure.
Figure 7:
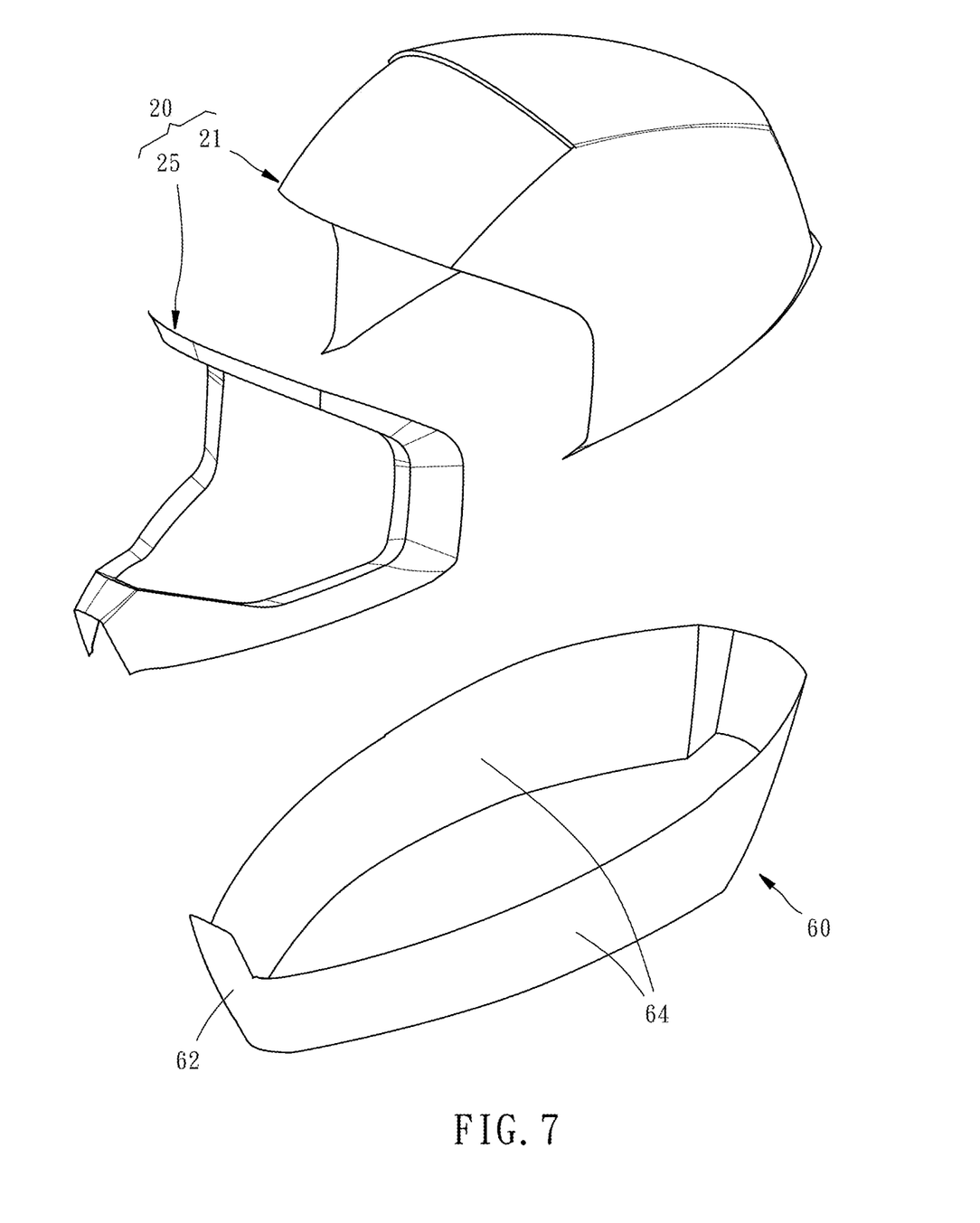
FIG. 7 is an exploded view of the helmet according to the fourth embodiment of the present disclosure.

To further simplify the manufacturing process, as shown in FIG. 5 illustrative of the second embodiment of the present disclosure, a shell 28 is integrally produced by vacuum forming. In the third embodiment of the present disclosure, a protector 50 is two-pieced. As shown in FIG. 6, the protector 50 has two opposing curved bars 52. The curved bars 52 are each integrally produced by vacuum forming. The front ends of the two curved bars 52 are connected to jointly form a jaw-protecting portion 54. The back ends of the two curved bars 52 are connected to jointly form a neck-protecting portion 56. In the fourth embodiment of the present disclosure, the protector 60 is of an annular structure integrally formed by vacuum forming. As shown in FIG. 7, a jaw-protecting portion 62 of the one-piece protector 60 is located at the first-half curved part, whereas a neck-protecting portion 64 of the one-piece protector 60 is located at the second-half curved part.

Figure 8:
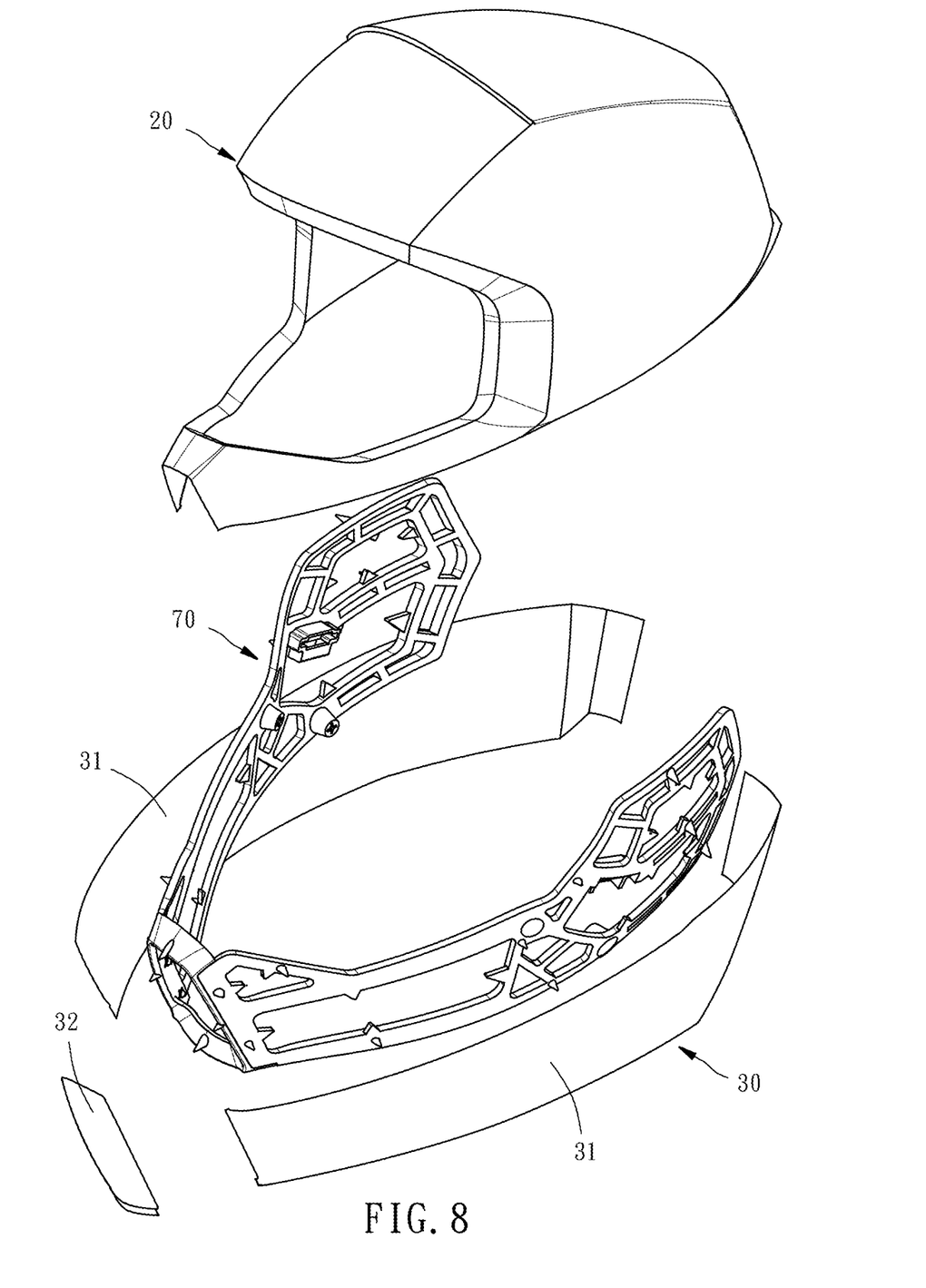
FIG. 8 is an exploded view of the helmet according to the fifth embodiment of the present disclosure.
Figure 9:
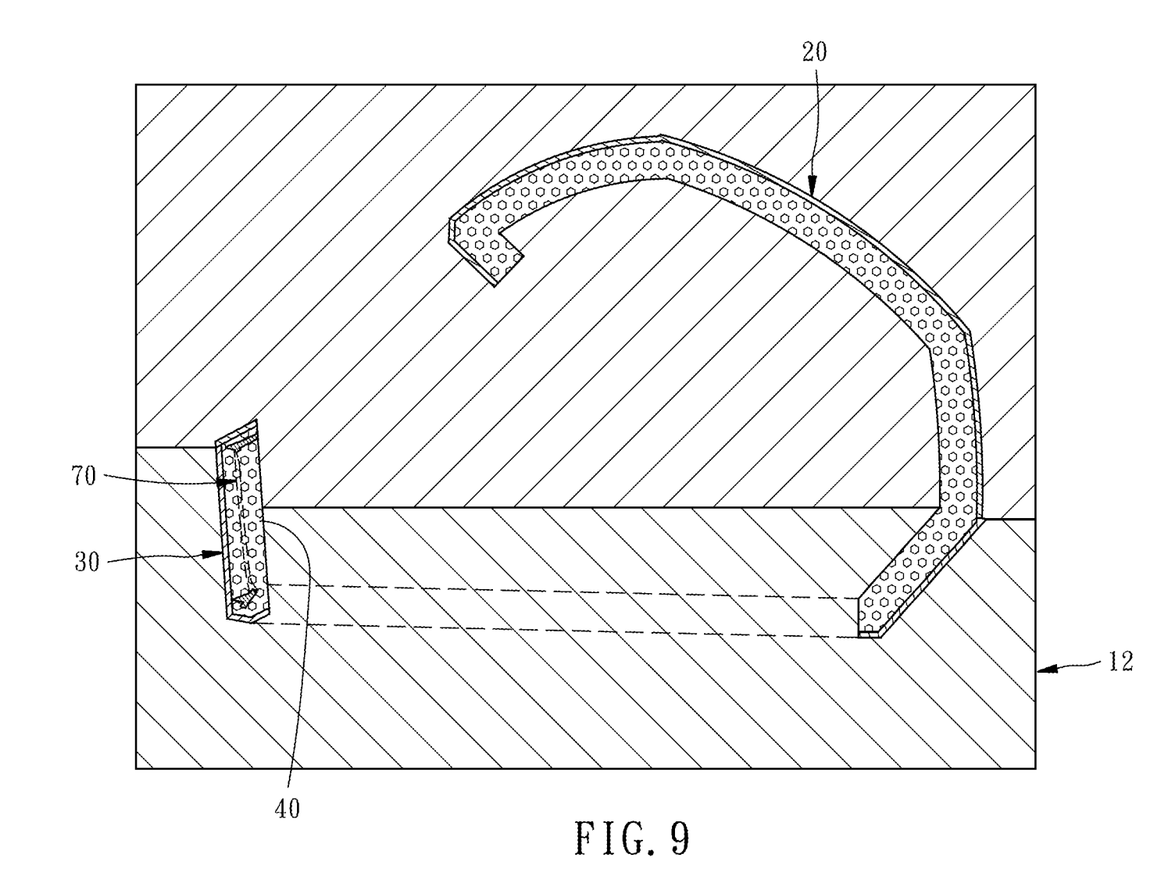
FIG. 9 is a cross-sectional view related to the manufacturing method according to the fifth embodiment of the present disclosure, showing that a shell, a protector and a support are put in the die.
Figure 10:
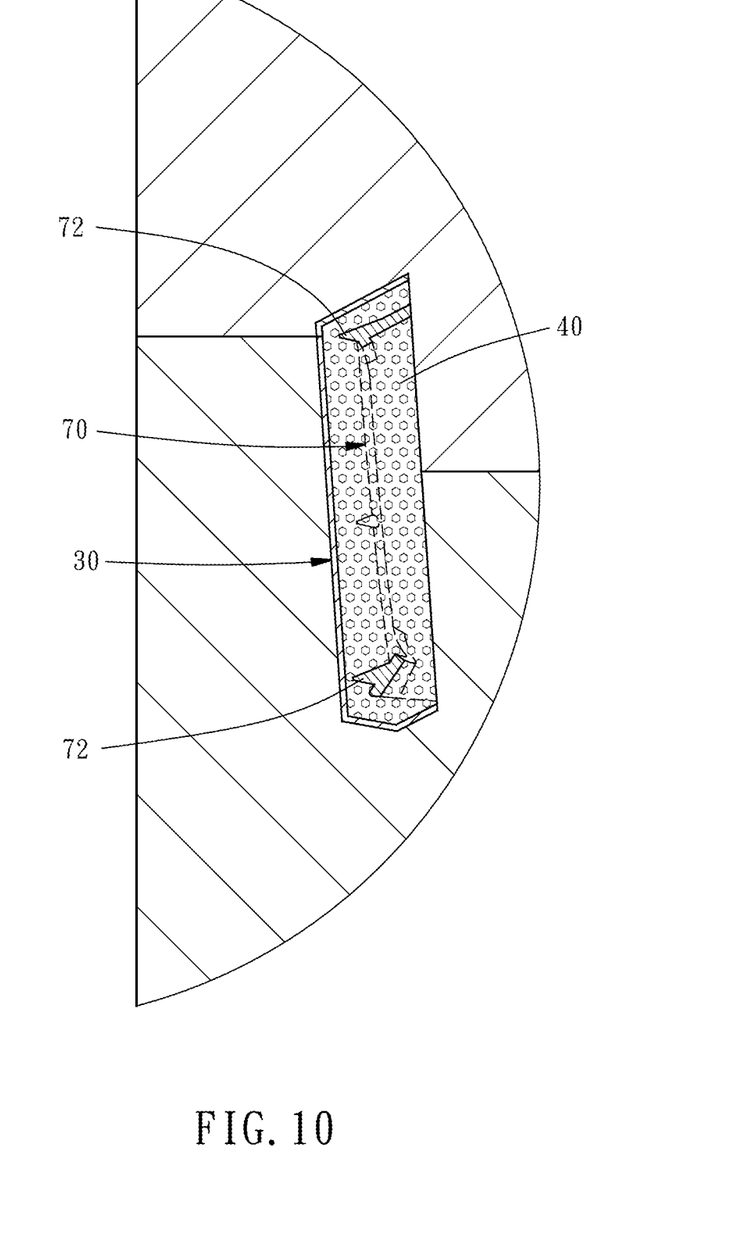
FIG. 10 is a partial enlarged view of FIG. 9.

In the fifth embodiment of the present disclosure, as shown in FIGS. 8 and 9, in step b), a support 70, the shell 20 and the protector 30 are put in the die 12, and then in step c), upon the completion of its expansion, the foam material 40 thus introduced not only couples the shell 20 and the protector 30 together, but also encloses the support 70 entirely, thereby enhancing the structural strength of the helmet because of the support 70. As shown in FIGS. 9 and 10, a plurality of conical portions 72 facing the protector 30 is disposed on one side of the support 70. The conical portions 72 not only allow gaps of appropriate sizes to be formed between the support 70 and the protector 30 such that the foam material 40 fills smoothly between the support 70 and the protector 30, but also increase the binding strength between the support 70 and the foam material 40, preventing their separation.

In this embodiment, the protector 30 is exemplified by the three-pieced structure described in the first embodiment. However, in practice, the protector may also have the two-pieced structure described in the third embodiment or the one-pieced structure described in the fourth embodiment. The protector 30 has at least one opening at the jaw-protecting portion 34 and/or the neck-protecting portion 36 to expose the support 70 partially such that the helmet finished product can vary in appearance.

In conclusion, the manufacturing method of the present disclosure enables the foam material 40 to fit tightly to the inner side of the shell 20 and the inner side of the protector 30, 50, 60 and minimize the gaps therebetween, thereby enhancing the structural strength of the helmet finished product. With the foam liner 42 being uniformly distributed on the inner side of the shell 20 and the inner side of the protector 30, 50, 60, the foam liner 42 effectively spreads any external impact on the shell 20 or the protector 30, 50, 60, thereby providing optimal protection to users.

What is claimed is:

1. A helmet manufacturing method, comprising the steps of:
    a) producing a shell, a protector and a support as separate pieces, the shell having a head-protecting portion and two opposing cheek-protecting portions, the two cheek-protecting portions extending downward, integrally from left and right ends of the head-protecting portion, respectively, the protector having a jaw-protecting portion and a neck-protecting portion, the neck-protecting portion extending backward, integrally from a back end of the jaw-protecting portion;
    b) putting the shell, the protector and the support in a die such that bottom edges of the cheek-protecting portions of the shell connect to a top edge of the neck-protecting portion of the protector, that bottom edges of the cheek-protecting portions connect to a top edge of the jaw-protecting portion of the protector, the support being disposed within the protector and facing a front end and side sections of the jaw-protecting portion;
    c) introducing a foam material into the die, applying heat and pressure to the foam material such that the foam material expands and binds to an inner side of the shell and an inner side of the protector, the support being fully enclosed in the foam material; and
    d) removing, upon completion of a foaming process, the die, so as to obtain a helmet finished product.

2. The manufacturing method of claim 1, wherein, in step a), two curved bars are produced by vacuum forming, and then the two curved bars are connected to form the protector.

3. The manufacturing method of claim 1, wherein, in step a), the protector is integrally produced by vacuum forming.

4. The manufacturing method of claim 1, wherein step a) entails producing two curved bars and one terminal cover by vacuum forming, connecting the terminal cover to front ends of the two curved bars at the front end of the jaw-protecting portion, connecting back ends of the two curved bars, thereby allowing the two curved bars and the terminal cover to jointly form the jaw-protecting portion.

5. The manufacturing method of claim 1, wherein, in step a), the shell has a plurality of hollowed-out recesses.

6. The manufacturing method of claim 1, wherein, in step a), the protector has a plurality of hollowed-out recesses.

7. The manufacturing method of claim 1, wherein, in step a), the shell is integrally produced by vacuum forming.

8. The manufacturing method of claim 1, wherein, in step a), a body and a front frame are produced by vacuum forming, and then the front frame is connected to a front edge of the body to form the shell.

9. The manufacturing method of claim 1, wherein a plurality of conical portions facing the protector is disposed on a side of the support.

* * * * *